(12) United States Patent
Peters

(10) Patent No.: US 9,909,418 B2
(45) Date of Patent: *Mar. 6, 2018

(54) PROTECTIVE ELEMENT, CONCRETE ELEMENT, AND METHOD FOR PRODUCING A CONCRETE ELEMENT

(71) Applicant: Herrenknecht AG, Freiberg (DE)

(72) Inventor: Marc Peters, Freiberg (DE)

(73) Assignee: Herrenknecht AG, Freiburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,578

(22) Filed: Jun. 15, 2016

(65) Prior Publication Data

US 2016/0290135 A1 Oct. 6, 2016

Related U.S. Application Data

(63) Continuation of application No. 13/521,405, filed as application No. PCT/EP2010/000102 on Jan. 12, 2010, now Pat. No. 9,388,691.

(51) Int. Cl.

| E21D 11/38 | (2006.01) |
|---|---|
| E21D 11/15 | (2006.01) |
| E21D 11/08 | (2006.01) |
| B28B 21/56 | (2006.01) |
| B29C 45/00 | (2006.01) |
| E21D 11/10 | (2006.01) |
| B29L 31/10 | (2006.01) |
| B29L 31/26 | (2006.01) |

(52) U.S. Cl.
CPC .......... *E21D 11/385* (2013.01); *B28B 21/563* (2013.01); *B29C 45/0053* (2013.01); *E21D 11/08* (2013.01); *E21D 11/107* (2013.01); *E21D 11/15* (2013.01); *B29L 2031/10* (2013.01); *B29L 2031/26* (2013.01)

(58) Field of Classification Search
CPC ....... E21D 11/08; E21D 11/385; E21D 11/15; E21D 11/083; E21D 11/00; E21D 11/107; F16L 55/163; F16L 57/00; B29C 45/0053; B29L 2031/10; B29L 2031/26; B28B 21/563
See application file for complete search history.

(56) References Cited

FOREIGN PATENT DOCUMENTS

WO  WO 2005/024183  * 3/2005

* cited by examiner

*Primary Examiner* — Carib A Oquendo
(74) *Attorney, Agent, or Firm* — Mark Rodgers

(57) ABSTRACT

The invention relates to a protective element (20) for connecting to a concrete element (10) of a tunnel lining, to the concrete element (10) and to the method for producing the concrete element (10). It is an object of the invention to provide a protective element (20) for a tunnel lining, or the associated concrete element, which ensures that the protective casing of the tunnel lining is better safeguarded against corrosive gases or liquids. The solution of the invention provides that the protective element (20) is produced from an injection-moldable plastics material, that a protective portion (21, 22, 23) is connected in a single piece to a seal (30), wherein the connection is gas-tight and liquid-tight, that the protective portion (21, 22, 23) is connected in a single piece to a connecting element (24, 25, 26, 27, 28), and that the single-piece connection is produced by injection molding of the plastics material.

8 Claims, 9 Drawing Sheets

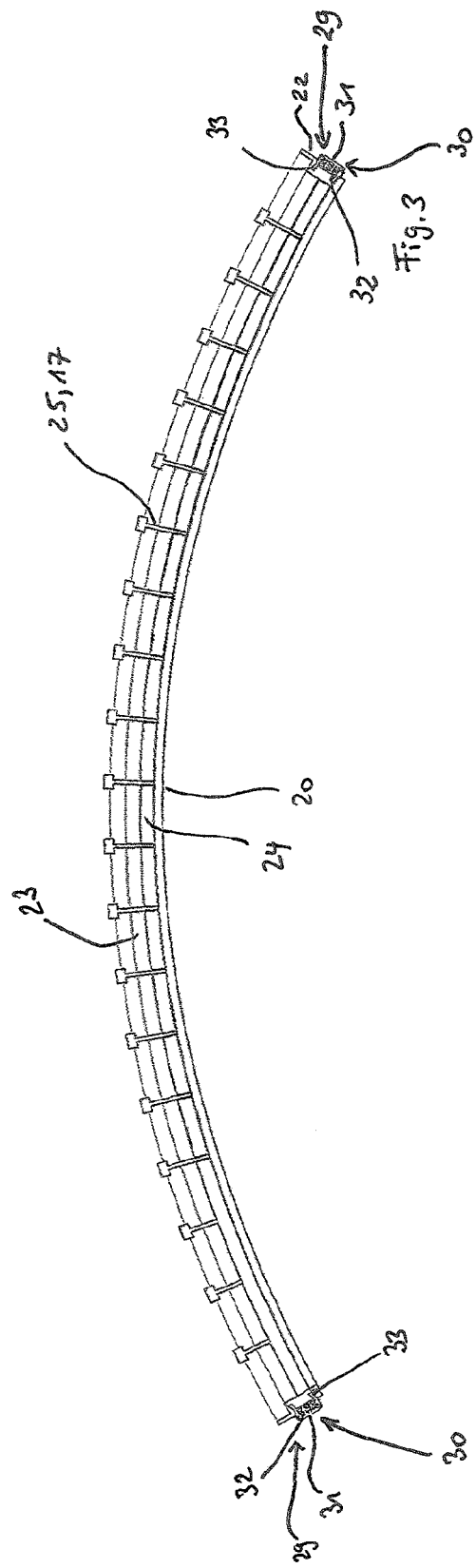

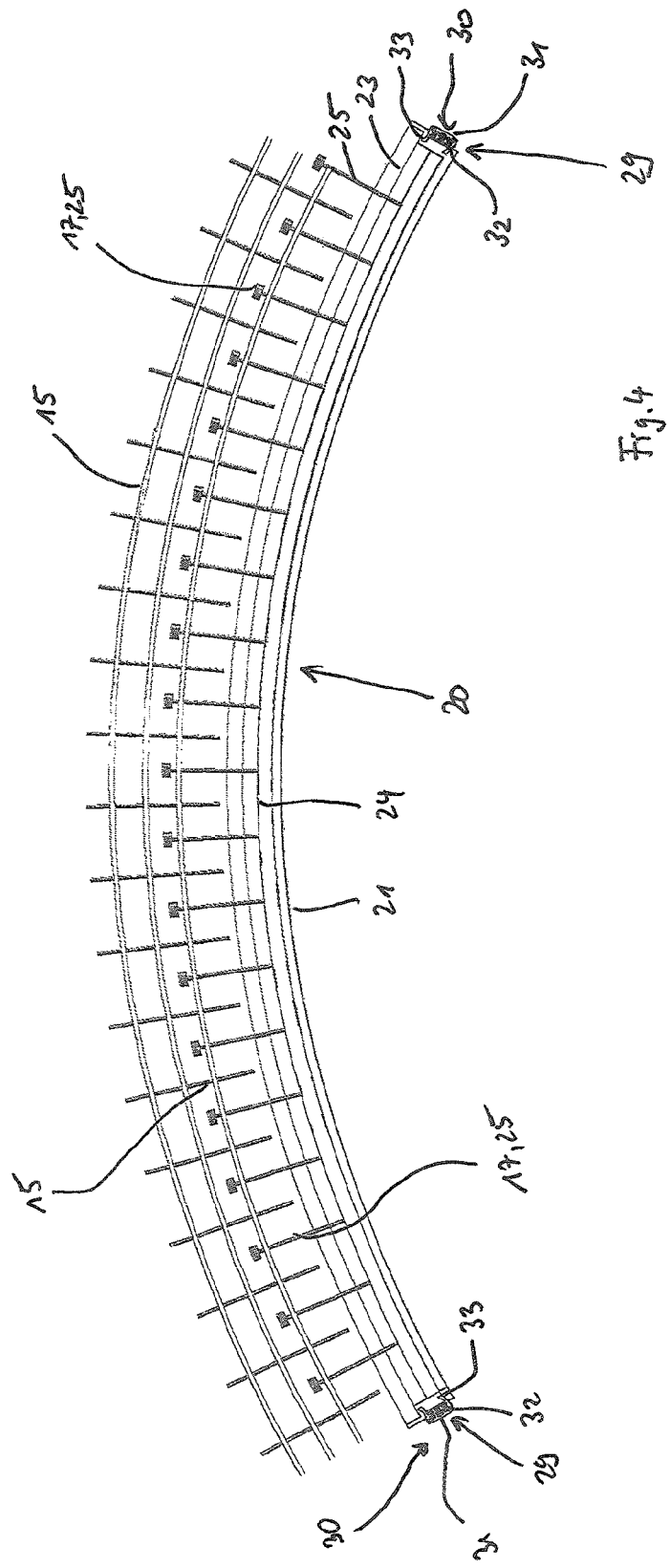

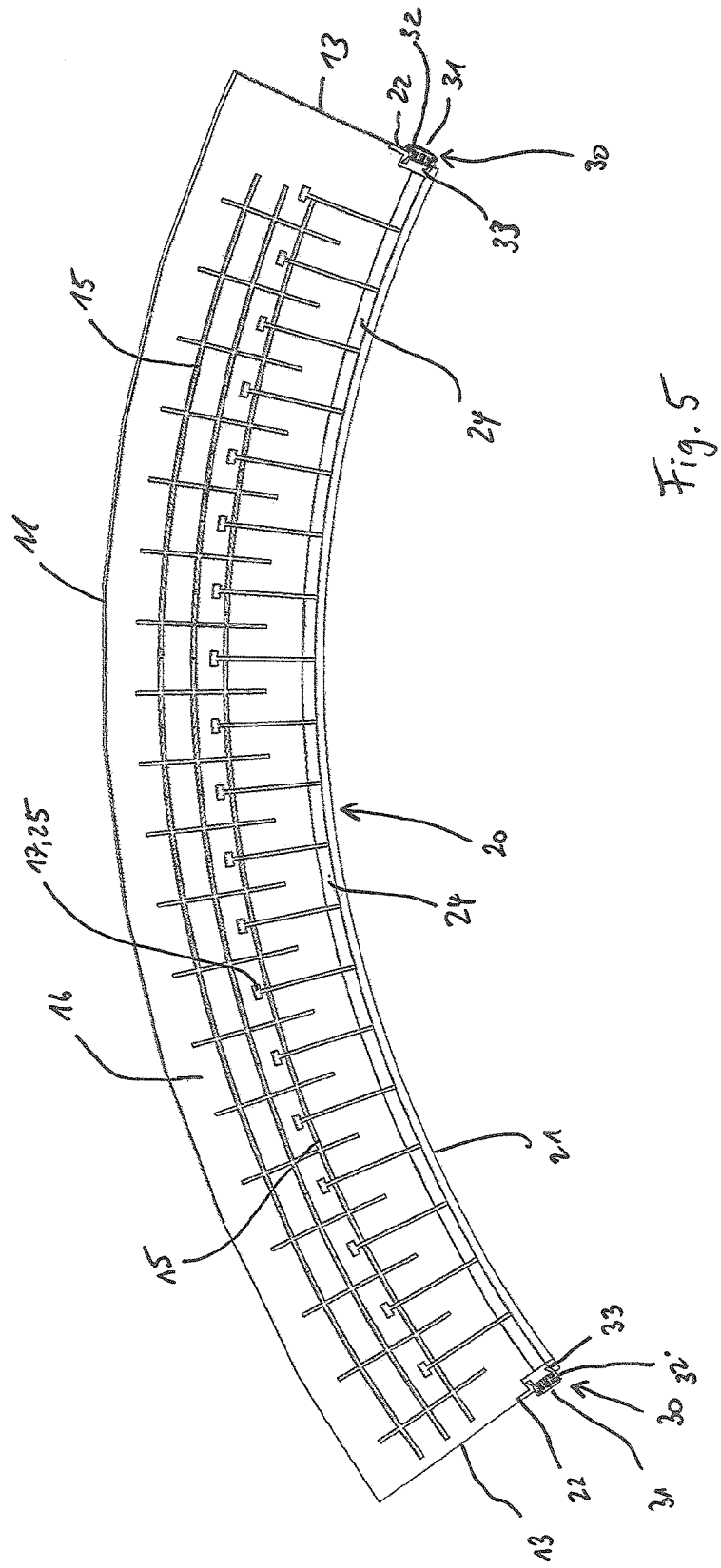

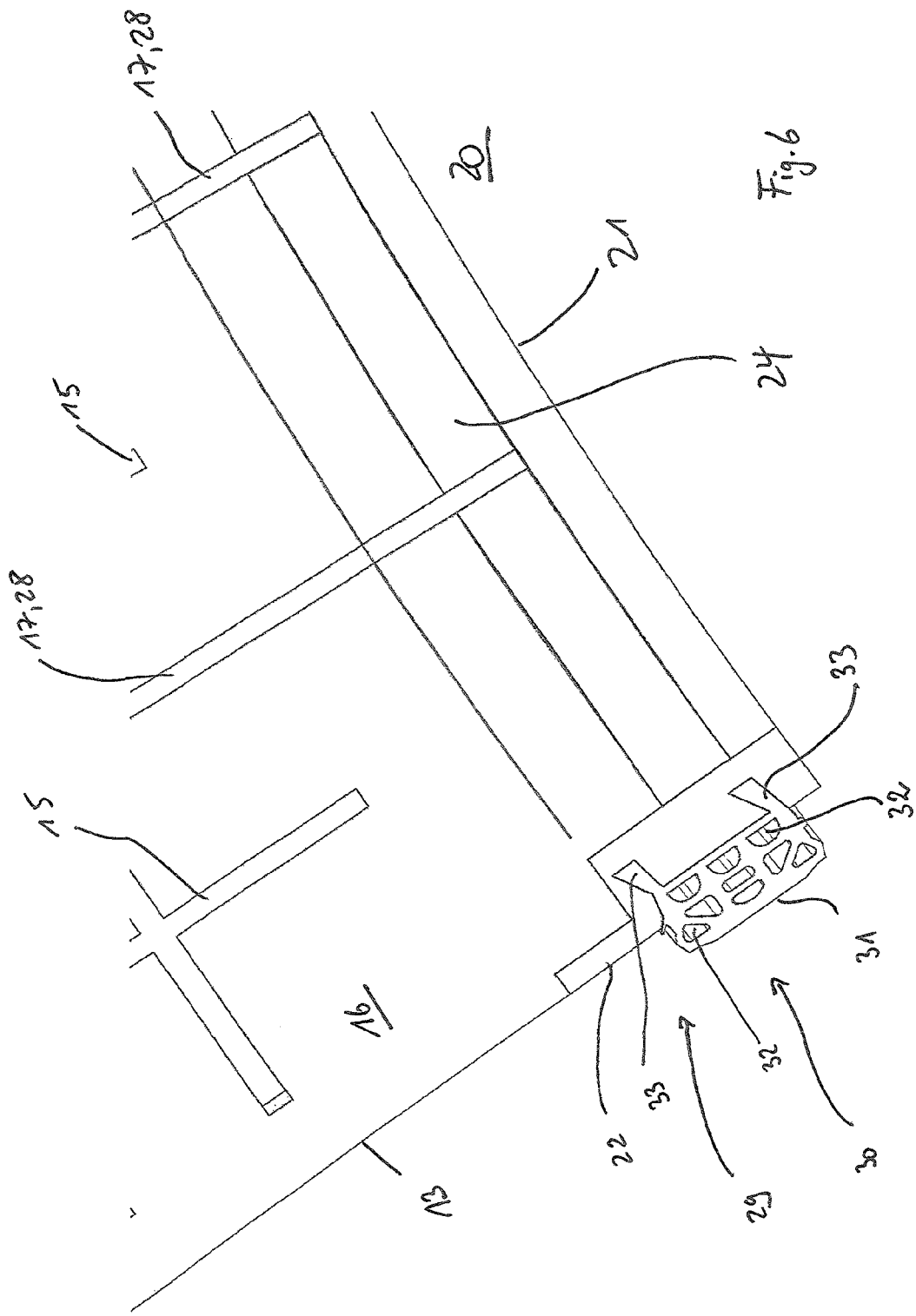

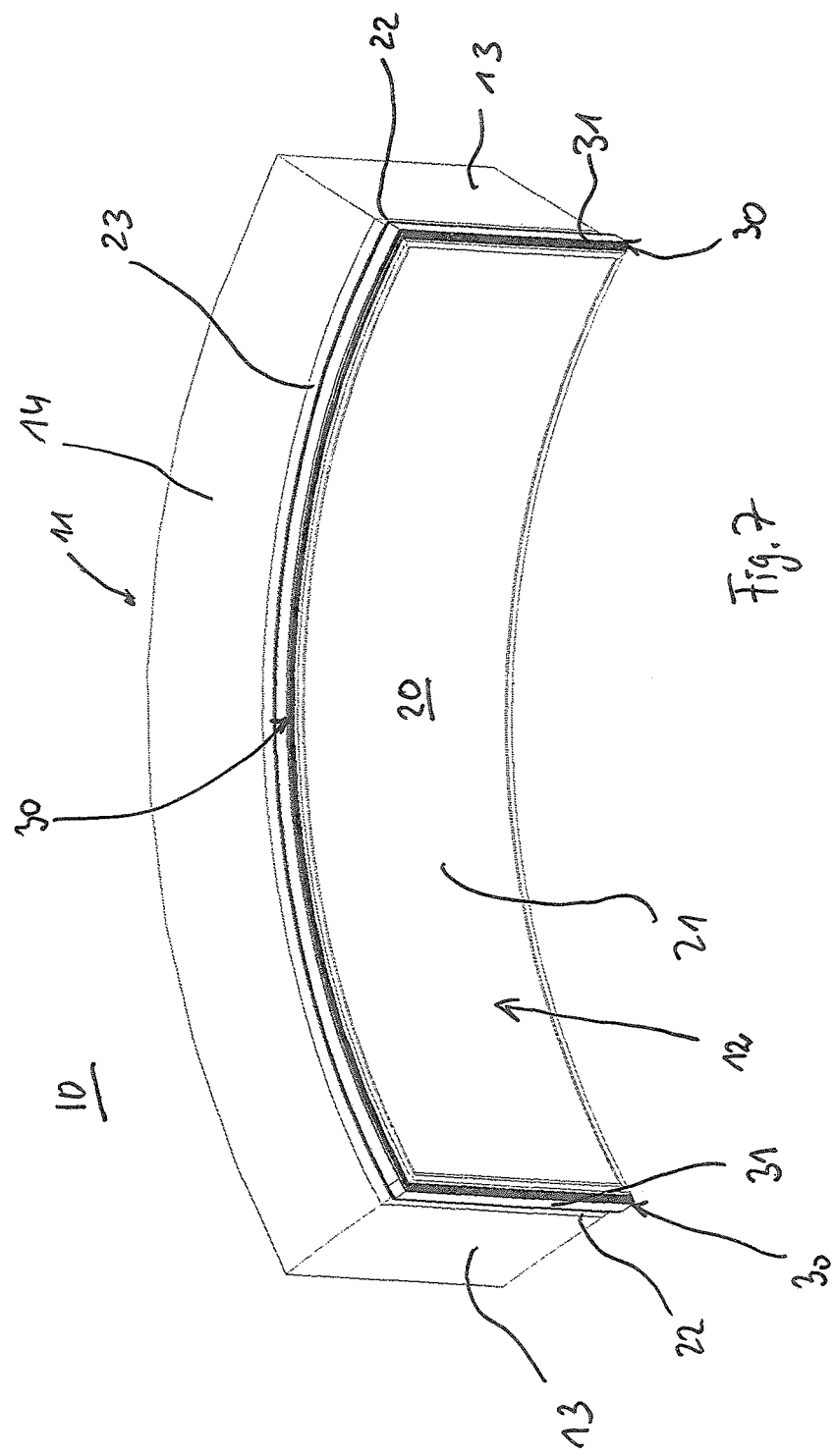

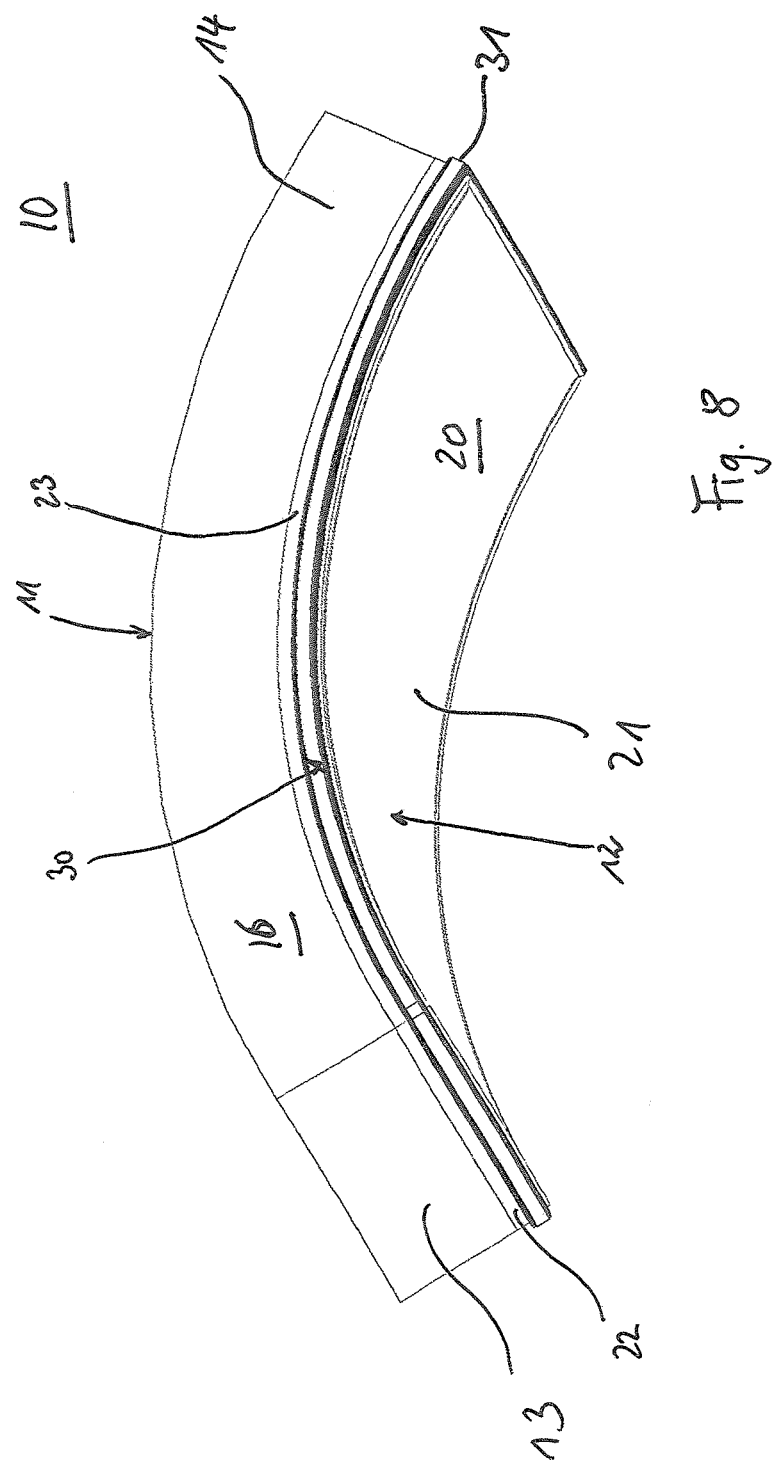

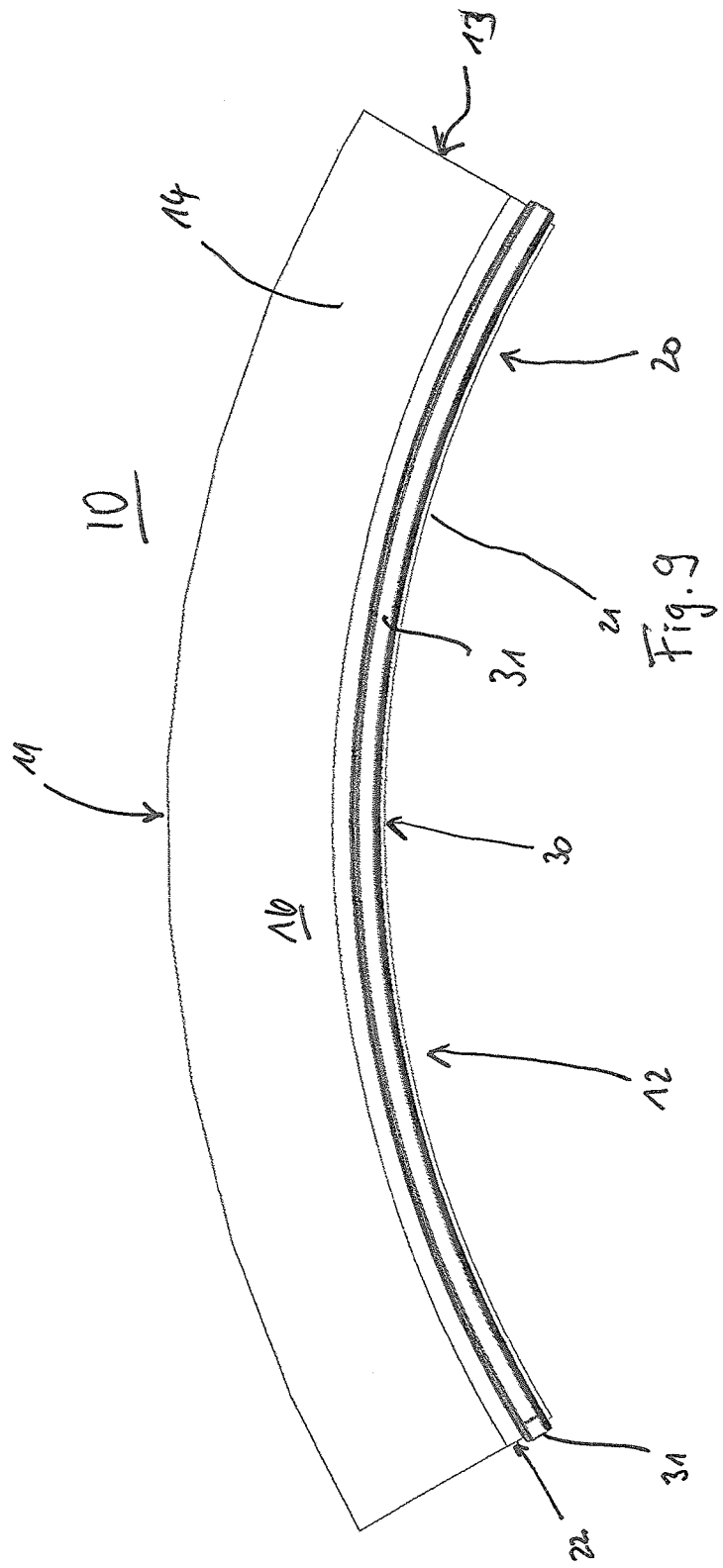

Figure 1:
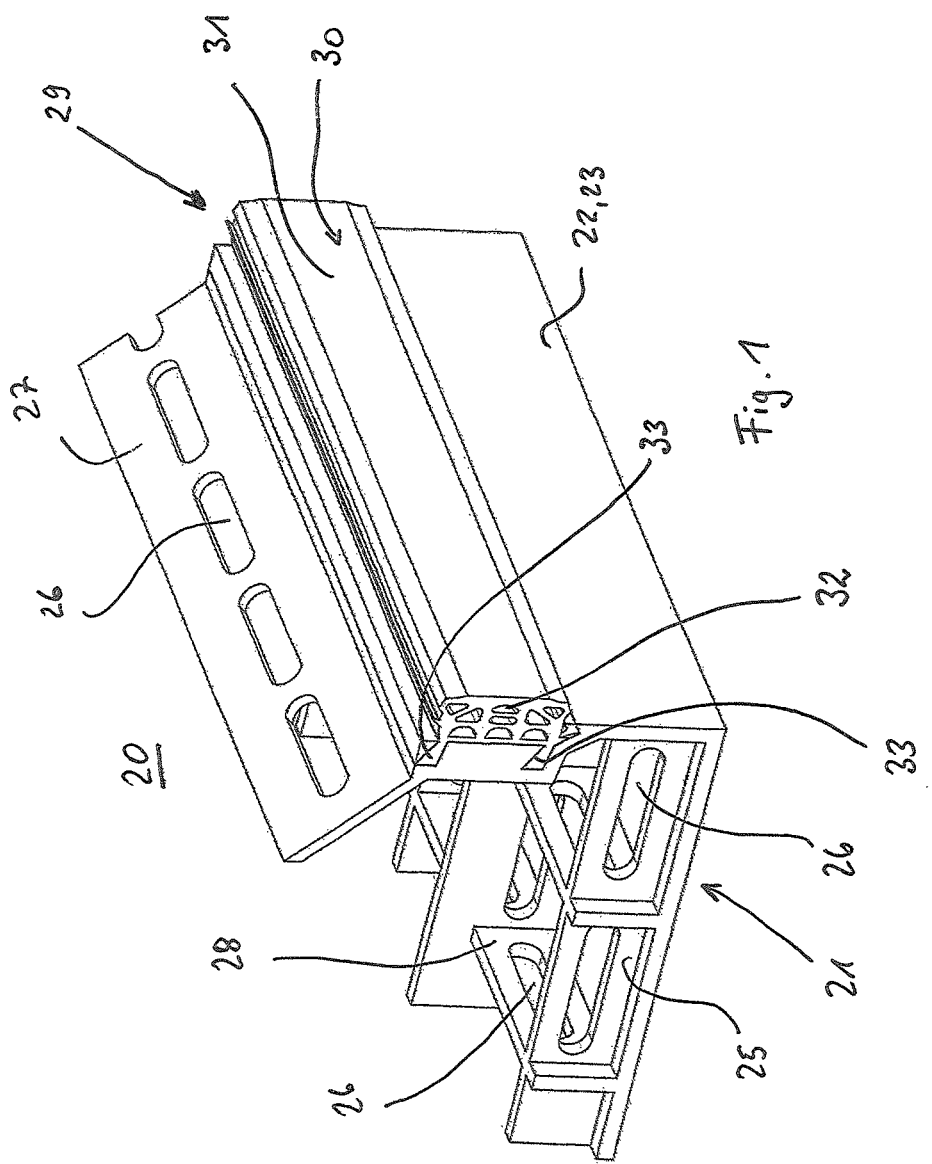

PROTECTIVE ELEMENT, CONCRETE ELEMENT, AND METHOD FOR PRODUCING A CONCRETE ELEMENT

The invention relates to a protective element for connecting to a concrete element of a tunnel lining and having a protective portion which can be connected, on its inner side, to at least one surface of the concrete element, wherein the protective portion consists of a plastics material, and the protective portion has, on its inner side, at least one connecting element for producing a durable connection to the concrete element. The invention also relates to a concrete element for producing a tunnel lining and having a convex outer surface and an inner surface located opposite, wherein a protective element is connected to the inner surface via at least one connecting element, and to a method for producing such a concrete element.

Such concrete elements and/or protective elements are known from WO 2005/024183 A1. Such concrete elements are also referred to in specialist circles as "tubbing" and are used, for example, in mechanized shield tunneling. Use is made here, for example, of tunneling boring machines which comprise a boring head, behind which is arranged a cylindrical shield with a cylindrical skin and a tail. The shield has a smaller external diameter than the boring head, and there is therefore no direct contact between the tunnel wall and shield. When the tunneling boring machine has advanced a certain distance, the concrete elements are positioned on the periphery at the tail of the shield. They are pressed, counter to the advancement direction, onto the adjacent, last-fitted concrete elements and connected thereto. A plurality of concrete elements together form a ring over the entire circumference of the tunnel. The gap between the ring and tunnel wall is filled with cement, e.g. in order to prevent settling.

This method of tunnel construction is also used, inter alia, for constructing wastewater lines, in particular relatively large collecting lines. As is also the case for other possible use purposes, the sealing of the casing of the tunnel here is subject to stringent requirements. The inner side of the tubbings is sealed by a casing, and therefore it is not possible for any wastewater, or any gases rising up from the wastewater, to pass into the concrete via the tunnel walls and to damage the same (corrosion).

WO 2005/024183 A1 discloses that the tubbings used for the tunnel lining are produced beforehand, and that a casing is arranged on the inner side of the tubbings as the latter are being produced, this casing, when the individual tubbing rings are in the assembled state, sealing the tunnel wall against water and gases. The concrete element here has provided on it a protective layer, which covers an inner surface of the tubbing, this inner surface being located opposite a convex outer surface. This protective layer is anchored firmly in the concrete by mechanical anchoring means, and therefore the protective layer is connected inseparably to the concrete. The protective layer here is designed such that part of a side surface of the concrete element is likewise enclosed and then a seal is provided thereon, the seal projecting beyond the protective layer. The seal is produced from an elastic material, and therefore, when the individual tubbings are assembled to form the tunnel lining, the joints between the adjacent concrete elements are closed by the seal.

The concrete element itself is produced by means of a formwork. A protective layer is positioned on the base of the formwork. Furthermore, likewise protective-layer elements are placed on the side walls of the formwork. The formwork also has an aperture, into which the seal is inserted. The concrete is then introduced into the formwork, in conjunction with reinforcement. Once the concrete has set, the tubbing is used as tunnel lining.

It has been found, in practice, that leakage occurs in the transition between the protective layer and seal if sufficient care has not been taken, during production of the concrete element, in respect of inserting the seal into the formwork and/or in respect of arranging the seal in relation to the protective layer.

It is therefore an object of the invention to provide a method for producing a concrete element and an improved protective layer which more reliably provides adequate sealing of the concrete elements in relation to wastewaters and gases and, at the same time, to provide a straightforward production method, which is also more cost-effective.

In respect of the protective-layer element, the object according to the invention is achieved in that the plastics material used is an injection-moldable plastics material, in that the protective portion is connected in a single piece to a seal, wherein the connection is gas-tight and liquid-tight, in that the protective layer is connected in a single piece to the connecting element, and in that the single-piece connection is produced by injection molding of the plastics material.

A liquid-tight and gas-tight connection is produced particularly straightforwardly by the single-piece connection of the seal and of the connecting elements to the protective portion. The injection molding can ensure that the protective elements are produced with a consistently high quality, and therefore, in respect of the completed concrete element, the protective action of the protective element is particularly high and of a consistently high quality, irrespective of the process used for producing the concrete element. The protective element here is formed such that, in relation to the seal, the injection-molding material surrounds the material of the seal at least on three sides. Since it is provided that, in the case of the concrete element being damaged, and thus of water pressure possibly prevailing from the outside, the protective element should be fully capable of withstanding the water pressure, it is also particularly advantageous if the shape and the material of the connecting elements are freely selectable, and if, in particular in the case of connecting elements which do not consist of plastics material, the injection molding can provide for a corresponding connection between the connecting element and protective portion. Furthermore, for the case where the connecting elements are likewise produced from the same plastics material as the protective element, the injection molding makes it possible to provide for a particularly wide variety of shapes for the connecting elements.

A further teaching of the invention provides that the protective portion has a base portion, preferably a base portion and a wall portion. This makes it possible to achieve a particularly good sealing action of the protective element in conjunction with the concrete element. A further teaching of the invention in this context provides also for a ceiling element, this therefore resulting in a hollow body, into which the concrete and possibly, during the injection-molding operation, reinforcement are then introduced. This is advantageous, in particular, if the concrete element also has to have its outer sides protected against aggressive waters in the ground.

A further teaching of the invention provides that the connecting element is a honeycomb structure, a cross-piece, a pin and/or a sheet-like element with openings. In particular sheet-like elements such as honeycomb structures or sheet-like portions with through-openings allow the protective element to be anchored to particularly good effect to the concrete element over the entire surface area of the protective element. The additional provision of pins or the like, which extend possibly further into the concrete of the concrete element, can give rise to an enhanced increase in the retaining force at certain points.

A further teaching of the invention provides that the plastics material is a polydicyclopentadiene (pDCPD), preferably in a form which is resistant to high temperatures, or a resin, wherein reinforcing elements, for example glass fibers, may possibly be added to the plastic resin. This plastics material makes it possible to achieve a high production speed, on account of the rapid processing properties. A particularly high resistance during use is achieved at the same time.

In respect of the concrete element for producing a tunnel lining, the teaching of the invention provides for use to be made of a protective element described above. Such a protective element makes it possible to achieve sufficient joint sealing, which seals the protective lining of the tunnel appropriately in relation to liquids and gases.

In respect of the production method according to the invention, the solution of the invention provides that a protective element described above is produced from a plastics material by injection molding, the completed protective element is inserted into a mold, and the protective element is connected to concrete and, once setting has taken place, is removed from the mold. The prefabrication of the protective element by injection molding, in the case of which the retaining elements and seal are connected in a single piece to the protective portion of the protective element, provides for a straightforward production method because the abovedescribed possible sources of error in the production of the concrete element are eliminated, since all that is required is for a single component to be introduced into the formwork, and therefore the source of error in the transition between protective layer and seal is eliminated. At the same time, a connection with a high retaining force between the protective element and concrete element is straight-forwardly provided. It is advantageous here if sufficient protective action, of consistent quality, is provided for the concrete elements even if the concrete elements are produced at the site of use of the tubbings.

It may also be advantageous if the upper side of the concrete elements is also provided with a protective element or a protective layer. It is possible here for this protective element or the protective layer to be provided even before the concrete is fed into the formwork or else thereafter, for example by being coated on.

Figure 2:
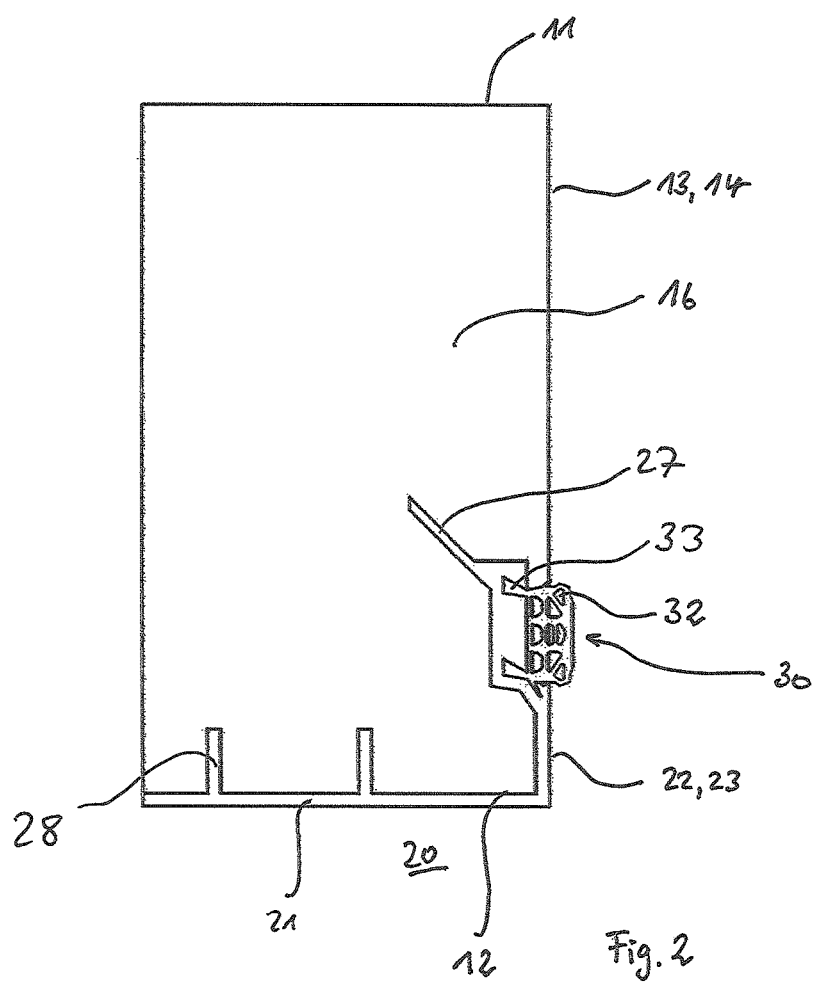

The invention will be explained in more detail hereinbelow with reference to drawings, in which:

FIG. 1 shows a three-dimensional, partly sectional view of a protective element according to the invention, FIG. 2 shows a sectional view of a concrete element according to the invention with a protective element according to FIG. 1, FIG. 3 shows a sectional view of a protective element according to the invention, FIG. 4 shows a sectional view of a protective element according to the invention with prepared reinforcement, FIG. 5 shows a sectional view through a concrete element according to the invention, FIG. 6 shows an enlarged detail of a sectional view of a corner region according to FIG. 5, FIG. 7 shows a first three-dimensional view of a concrete element according to the invention, FIG. 8 shows a second three-dimensional illustration of a concrete element according to the invention, and FIG. 9 shows a side view of a concrete element according to the invention.

A concrete element 10 according to the invention (FIGS. 7 to 9) is a segment portion (tubbing) of a tunnel lining. The segment portion has a convex upper side 11 and an inner side 12 (concealed by a protective element 20 in FIGS. 7 to 9) arranged opposite the upper side. The protective element 20 is arranged on the inner side 12 of the concrete element. The protective element 20 has a base portion 21 and wall portions 22, 23. An accommodating region 29, in which a seal 30 is arranged, is provided on these wall portions 22, 23. The connection between the seal 30 and protective element 20 takes place by injection molding.

A first embodiment of the protective element 20 according to the invention is illustrated in FIGS. 1 and 2. A further embodiment is illustrated in FIGS. 3 to 6.

The protective element 20 has, as illustrated in FIG. 1, a base portion 21, on the outer sides of which wall portions 22, 23 are arranged essentially at right angles, although they may also be in any other desired arrangement. In order to produce a durable connection between the protective element 20 and the concrete element 10, the inner side of the base portion 21 has crosspieces 25, 28, wherein the crosspieces 25 are arranged parallel to one outer wall and the crosspieces 28 are arranged parallel to the outer wall arranged at right angles thereto. The crosspieces 25, 28 are provided with openings 26, through which the concrete 16 can pass and thus, once it has set, produces a particularly durable connection. In order to achieve a durable connection of the wall portions 22, 23, a protrusion 27 is provided, this being positioned on the wall portion 22, 23 at an angle of 45-90° and being provided with openings 26 likewise in order to produce a durable connection.

The seal 30 is arranged in an accommodating region 29. The seal 30 consists of an elastic plastics material. The seal 30 has a sealing surface 31 which, when the individual concrete elements are being assembled, comes into contact with either another concrete surface or another sealing surface 31 of a seal 30. The seal 30 has chambers 32 in its interior. When the concrete elements 10 are being assembled, the elastic plastics material of the seal 30 is deformed and the chambers 32 are compressed. Retaining protrusions 33 are arranged opposite the sealing surface 31, and engage in the plastics material of the side wall 22, 23 of the protective element 20. These retaining protrusions and the nearby side walls of the seal 30 become connected to the plastics material of the protective element during injection molding or are surrounded thereby in a gas-tight manner.

In the embodiment of the protective element 20 according to FIGS. 3 to 6, a honeycomb structure 24 is arranged on the inner side of the base portion 21 of the protective element 20. When the concrete 16 is introduced into the protective element 20, concrete 16 can penetrate into the honeycomb structure 24 and set there. The high surface of the honeycomb structure 24 provides for a large contact surface area between the honeycomb structure 24 and concrete 16, and therefore high retaining forces are present once the concrete 16 has set. The honeycomb structure 24 is assisted by further connecting elements, which are likewise in the form of crosspieces 25, 28 or pin elements 17. It is possible for the crosspieces and/or pins 17 to be formed from the plastics material of the protective element 20 or as an alternative, or in addition, for these to be provided from other material, for example metal. The arrangement of the seal 30 in relation to the protective element 20 corresponds to FIGS. 1 and 2. In FIG. 4, a reinforcement 15 is provided in addition to the connecting elements in the form of pins or crosspieces 25. The reinforcement either, as illustrated in FIG. 4, rests on the connecting elements 17, 25 or, as an alternative, can also rest on the honeycomb structure 24 or the base portion 21. FIG. 5 shows a section through a concrete element according to the invention. The reinforcement 15 here, just like the honeycomb structure 24 and the crosspieces 25 and/or pins 17, is surrounded by the concrete 16.

A concrete element 10 according to the invention is produced by a formwork which is in the shape of the subsequent concrete element. Depending on the shape of the individual tunnel-lining elements 10, the exterior shape here may be a circle-segment portion. The plan view may be, for example, either rectangular or trapezoidal. This formwork has inserted into it a prepared protective element 20 which, during production, was connected in a single piece to the seal 30. Following insertion of the protective element 20, the reinforcement 15 is inserted into the formwork, and the concrete 16 is cast in place.

As an alternative, the protective element 20 may be configured such that it is a hollow body into which the concrete is introduced, as a result of which it is possible to dispense with the formwork. The reinforcement 15 is then introduced during production of the hollow body or is introduced into the hollow body together with the concrete (fiber reinforcement).

The protective element 20 is produced by an injection mold, which is representative of the shape of the protective element 20, being created. The seal 30 is then positioned in the injection mold, in the accommodating region 29 provided for this purpose. Connecting means 17, 25, 28 and/or reinforcement 15 can be introduced into the injection mold, in addition, provided that these are produced from a material different from the protective element itself. The injection-moldable plastics material is then introduced into the injection mold. Once the plastics material has hardened, the protective element 20 can be removed from the mold and supplied for producing the concrete element 10.

The side walls 13 of the concrete element 10 contain cavities (not illustrated), into which are inserted brackets (not illustrated), in which bolts (not illustrated) are arranged in order to connect the individual concrete elements 10 to one another to form a ring. The seals 30 of the concrete elements 10 connected to one another via the bolts butt against one another and are pressed together, and therefore they fully seal the gap or the joint between the two concrete elements 10. When the concrete elements 10 according to the invention are used for casing a tunnel, there is therefore no need to provide any sealing for the joints between the concrete elements 10.

Also provided are guide holes (not illustrated), into which guide rods (not illustrated) can be inserted. The guide holes are provided either in the side walls 14 of the concrete elements 10 or in the form of a half-element in the side walls 13. When two concrete elements are assembled via the bolts, these half-segments then form the guide hole. With the aid of the guide rods, the concrete elements 10 of the following lining ring of the tunnel lining can easily be positioned in a precise manner, since these elements likewise have the guide holes and the guide holes are then introduced into the guide rods.

LIST OF DESIGNATIONS

10 Concrete element
11 Upper side
12 Inner side
13 Side wall
14 Side wall
15 Reinforcement
16 Concrete
17 Pin element
20 Protective element
21 Base portion
22 Wall portion
23 Wall portion
24 Honeycomb structure
25 Crosspiece
26 Opening
27 Protrusion
28 Crosspiece
29 Accommodating region
30 Seal
31 Sealing surface
32 Chamber
33 Retaining protrusion

The invention claimed is:

1. A sealing element for a plurality of concrete tubbing elements, the concrete tubbing elements having a convex inner surface, a convex outer surface and side surfaces between the inner and outer surfaces, comprising a protective layer element configured to extend over portion of a side surface of the tubbing element, the protective layer element connected in a single piece to a seal, with the seal projecting from the protective layer element,
wherein;
the protective layer element comprises a wall portion; the seal is integrally formed as one piece to a part of the wall portion; the seal includes a sealing portion and a retaining portion opposite to the sealing portion; the retaining portion comprises at least one retaining protrusion to engage the wall portion and form a liquid and gas tight seal with the wall portion.

2. The sealing element as claimed in claim 1 wherein the wall portion is made of a plastics material.

3. The sealing element as claimed in claim 2 wherein the plastics material is polydicyclopentadiene (pDCPD).

4. The sealing element as claimed in claim 1, comprising a connecting element configured to extend into the concrete of the tubbing element.

5. The sealing element as claimed in claim 4, wherein the connecting element is at least one of a honeycomb structure, a crosspiece, a pin, or a sheet-like element with openings.

6. A concrete tubbing element for producing a tunnel lining and having a convex outer surface and an inner surface located opposite, comprising a sealing element as in claim 1.

7. The concrete tubbing element of claim 6 wherein the sealing element is connected to the inner surface via at least one connecting element.

8. A method for producing a concrete tubbing element as in claim 6, comprising:
   a. producing the sealing element from plastics material by injection molding,
   b. inserting the completed sealing element into a mold,
   c. connecting the sealing element to concrete; and,
   removing the sealing element from the mold together with the completed concrete tubbing element once setting has taken place.

* * * * *